(12) United States Patent
Konishi (10) Patent No.: US 10,066,553 B2
(45) Date of Patent: Sep. 4, 2018

(54) V ENGINE HAVING VALVE PROPERTY VARYING MECHANISM

(71) Applicant: HONDA MOTOR CO., LTD., Tokyo (JP)

(72) Inventor: Yukio Konishi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/607,787

(22) Filed: May 30, 2017

(65) Prior Publication Data

US 2017/0350324 A1    Dec. 7, 2017

(30) Foreign Application Priority Data

Jun. 2, 2016  (JP) ................................. 2016-111003

(51) Int. Cl.

| | |
|---|---|
| *F01M 1/06* | (2006.01) |
| *F02D 13/02* | (2006.01) |
| *F01M 1/04* | (2006.01) |
| *F01M 11/02* | (2006.01) |
| *F02F 1/20* | (2006.01) |
| *F02B 67/06* | (2006.01) |
| *F02B 75/22* | (2006.01) |

(52) U.S. Cl.
CPC ........... *F02D 13/0207* (2013.01); *F01M 1/04* (2013.01); *F01M 11/02* (2013.01); *F02B 67/06* (2013.01); *F02F 1/20* (2013.01); *F02B 75/22* (2013.01); *F02B 2275/18* (2013.01)

(58) Field of Classification Search
CPC ... F02B 2275/18; F02D 13/0207; F01M 1/04; F01M 11/02; F02F 1/20
USPC ......... 123/90.15, 90.16, 90.17, 90.33, 90.34, 123/90.39
See application file for complete search history.

(56) References Cited

U.S. PATENT DOCUMENTS 8,051,820 B2 *  11/2011  Shoji ....................... F01L 1/053
                                                         123/90.33

FOREIGN PATENT DOCUMENTS

JP          S6269051         4/1987

* cited by examiner

*Primary Examiner* — Ching Chang
(74) *Attorney, Agent, or Firm* — Armstrong Teasdale LLP (57) ABSTRACT

Provided is a V engine which uses common cylinder heads, and permits favorable arrangement of oil passages so as to accommodate various oil regulating features that are required to operate valve property varying mechanisms. Each end of each cylinder head is formed with a plurality of distribution oil passages opening out at an upper surface of the cylinder head for supplying oil pressure from a main gallery to a valve actuating mechanism. A pair of oil passage connecting members internally defining mutually different connecting oil passages are attached to the upper surfaces of the corresponding end parts of the respective cylinder heads.

10 Claims, 9 Drawing Sheets

V ENGINE HAVING VALVE PROPERTY VARYING MECHANISM

TECHNICAL FIELD

The present invention relates to a V engine using two cylinder heads made from common cylinder heads having an essentially same configuration.

BACKGROUND ART

V engines having two cylinder banks typically use cylinder heads of different configurations, typically a mirror image of each other. In particular, the camshaft of each cylinder bank projects axially beyond the timing belt end of the cylinder head, but extends short of the opposite end of the cylinder head.

The need for cylinder heads of two different configurations in manufacturing V engines obviously adds to the manufacturing cost. Therefore, it has been proposed to use common cylinder heads for the two cylinder banks of a V engine. See JPS62-69051U, for instance. In this prior art, two different adapters are attached to the timing belt ends of the respective cylinder heads so that the timing pulleys attached to the respective camshafts may be positioned on a same plane, and the opposite ends of the cylinder heads are closed by lid plates.

However, this prior art is only concerned with the arrangements for supporting the camshafts, and no considerations are given to the arrangement of the oil passages. As the modern automotive engines are provided with highly complex oil passage systems, for improved lubrication of the engines and the use of engine oil as a working fluid for various actuating purposes. Therefore, there is a need for an improved V engine which uses common cylinder heads and permits a favorable arrangement of oil passages.

SUMMARY OF THE INVENTION

In view of such problems of the prior art, a primary object of the present invention is to provide a V engine which uses common cylinder heads, and permits favorable arrangement of oil passages.

A second object of the present invention is to provide a V engine which uses common cylinder heads, and can accommodate various oil regulating features that are required to operate valve property varying mechanisms.

To achieve such objects, the present invention provides a V engine (1), comprising: a cylinder block (3) including a first cylinder bank (2F) and a second cylinder bank (2R), and defining a main gallery (46) extending along a crankshaft axis of the engine, each cylinder bank defining a row of cylinders; a first cylinder head (4F) attached to an upper end of the first cylinder bank; a second cylinder head (4R) attached to an upper end of the second cylinder bank, the second cylinder head being of a same configuration as the first cylinder head, and disposed in an inverted relationship to the first cylinder head with respect to the crankshaft axis of the engine; a first valve actuating mechanism (21F) for driving intake valves (17I) and exhaust valves (17E) of the first cylinder head, the first valve actuating mechanism including an intake sprocket (42I) attached to an end of an intake camshaft (25I) and an exhaust sprocket (42E) attached to an end of an exhaust camshaft (25E), the intake sprocket and the exhaust sprocket being rotatively actuated by a crankshaft (14) of the engine; a second valve actuating mechanism (21R) for driving intake valves and exhaust valves of the second cylinder head, the second valve actuating mechanism including an intake sprocket (42I) attached to an end of an intake camshaft (25I) and an exhaust sprocket (42E) attached to an end of an exhaust camshaft (25E), the intake sprocket and the exhaust sprocket being rotatively actuated by the crankshaft of the engine; a first shelf portion (65) formed in an end part of the first cylinder head remote from a sprocket end part thereof and internally defining a plurality of distribution oil passages (47) opening out at an upper surface of the first shelf portion, at least one of the distribution oil passages (82) communicating with the main gallery; a second shelf portion (65) formed in a sprocket end part of the second cylinder head and internally defining a plurality of distribution oil passages (47) opening out at an upper surface of the second shelf portion, at least one of the distribution oil passages (81) communicating with the main gallery; a first oil passage connecting member (66) attached to the upper surface of the first shelf portion and internally defining a first connecting oil passage communicating with the distribution oil passages opening out at the upper surface of the first shelf portion in a first pattern; and a second oil passage connecting member (68) attached to the upper surface of the second shelf portion and internally defining a second connecting oil passage communicating with the distribution oil passages opening out at the upper surface of the second shelf portion in a second pattern.

Each oil passage connecting member internally defining a connecting oil passage allows oil passages to be arranged in an optimum fashion even when the cylinder heads consist of common cylinder heads arranged in mutually inverted relationship. In particular, the oil can be supplied to the valve actuating mechanisms of the two cylinder heads as two differently controlled flows so that the oil flow to the two valve actuating mechanisms can be designed in an optimum fashion while simplifying the manufacturing process by using a same basic configuration for the two cylinder heads.

Typically, the V engine further comprises a valve property varying mechanism (23, 24) for varying a lift property of the intake valves and/or exhaust valves by being actuated by oil pressure supplied via at least one of the distribution oil passages.

The valve property varying mechanism which may be provided in one of the cylinder heads or both of the cylinder heads can receive a properly controlled oil pressure and/or oil flow. Also, even when a relatively complex valve property varying mechanism is incorporated in the cylinder heads, the necessary oil passage system can be formed in the cylinder heads which may consist of common cylinder heads arranged in mutually inverted relationship without complicating the oil passage system of the engine.

In a preferred embodiment of the present invention, open ends of the distribution oil passages (47) opening out at the upper surface of one of the first and second shelf portions (65) are fitted with orifice forming members in a pattern different from that for open ends of the distribution oil passages opening out at the upper surface of the other of the first and second shelf portions.

Thereby, the various mechanisms requiring oil for lubrication and actuation may individually receive properly controlled oil pressures. The pattern of orifice forming members may be such that one of the shelf portions have no orifice forming members while the other shelf portion have orifice forming members fitted into a part of the open ends of the distribution oil passages without departing from the spirit of the present invention.

The upper surface of each shelf portion may be lower than a parting plane between the corresponding cylinder head and a head cover (5) attached to an upper end of the cylinder head.

Thereby, an oil passage connecting member having a desired configuration can be attached to the upper surface of the shelf portion without interfering with the head cover.

In a particularly preferred embodiment of the present invention, the sprocket end part of the first cylinder head is formed with a semicircular recess surrounding the corresponding intake camshaft or exhaust camshaft in cooperation with a corresponding semicircular recess formed in a cam cap or the head cover, a pair of annular oil passages (63) being defined by semicircular grooves formed in an inner circumferential surface of the semicircular recess formed in the sprocket end part of the first cylinder head and corresponding semicircular grooves formed in an inner circumferential surface of the semicircular recess formed in the cam cap or the head cover; and the second oil passage connecting member includes a lateral extension defining a semicircular recess surrounding the corresponding intake camshaft of exhaust camshaft in cooperation with a corresponding semicircular recess formed in a cam cap or the head cover, a pair of annular oil passages (63) being defined by semicircular grooves formed in an inner circumferential surface of the semicircular recess of the lateral extension of the second oil passage connecting member and corresponding semicircular grooves formed in an inner circumferential surface of the semicircular recess formed in the cam cap or the head cover.

Thereby, the annular oil passages can be provided in the same ends of the two cylinder heads without unduly increasing the complexity of the common cylinder head configuration. The annular oil passages allow oil to be supplied to oil passages internally defined in the corresponding camshaft.

The valve property varying mechanism may comprise a variable valve lift mechanism using oil pressure supplied via the annular oil passages and internal passages of the intake camshaft and/or the exhaust camshaft, and/or a variable valve timing mechanism (24) using oil pressure supplied via the annular oil passages and internal passages of the intake camshaft and/or the exhaust camshaft.

These mechanisms can receive respective supplies of oil via oil passages formed in the cylinder head(s) and/or the oil passages formed in the camshafts.

According to a preferred embodiment of the present invention, the valve property varying mechanism may comprise a valve rest mechanism (23) including a valve lifter (28) interposed between a valve stem (32) of an engine valve (17) and a swing end of a rocker arm (26) and provided with a switch member (38) moveable under oil pressure between a valve rest position and a valve active position, one of the distribution oil passages being configured to supply lubricating oil for the valve lifter and a working oil for actuating the switch member into one of the two positions, and a different one of the distribution oil passages being configured to supply a working oil for actuating the switch member into the other position.

Thereby, the oil passages for the valve rest mechanism can be arranged in a simple manner. In particular, it may be arranged such that the valve rest mechanism is provided in only one of the cylinder heads (only in the second cylinder head, for example), and the distribution oil passages configured to supply a working oil for actuating the switch member into the other position for the cylinder head without the valve rest mechanism (e.g., the first cylinder head) is disconnected from the valve lifter by the associated oil passage connecting member (e.g., the first oil passage connecting member 66).

Preferably, at least the second cylinder head is formed with a pair of rocker arm lubricating oil passages (84) for lubricating intake side and exhaust side rocker arms, a pair of first valve lifter oil passages (85) for lubricating the intake side and exhaust side valve lifters and actuating the switch members of the intake side and exhaust side valve lifters into one of the two positions, and a pair of second valve lifter oil passages (86) for actuating the switch members of the intake side and exhaust side valve lifters into the other position, all extending horizontally along the crankshaft axis.

Thereby, the oil passage system of the engine can be simplified, in particular, when the two cylinder heads consist of common cylinder heads arranged in mutually inverted relationship.

DESCRIPTION OF THE PREFERRED EMBODIMENT(S)

A preferred embodiment of the present invention is described in the following with reference to the appended drawings.

Figure 1:
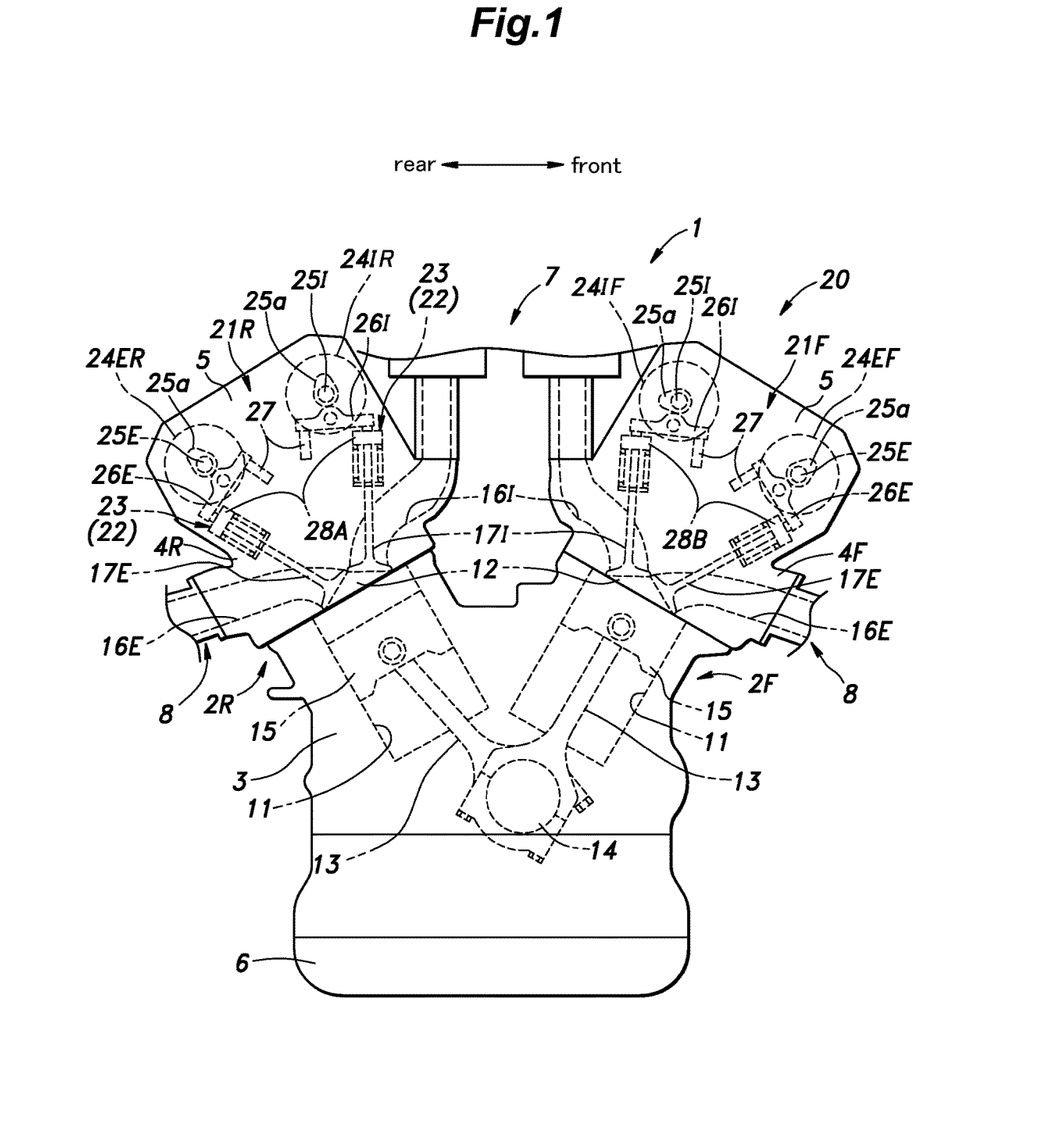
FIG. 1 is a perspective view of a V engine of an embodiment of the present invention.

FIG. 1 is a front view of an engine 1 fitted with a variable valve actuating device embodying the present invention. The engine 1 consists of a DOHC, 6-cylinder, 4-valve, V engine, and is mounted laterally on a vehicle with the right hand side of the engine 1 positioned on the front side of the vehicle as shown in FIG. 1. The directions referred to in the following description will be based on the directions with respect to the vehicle.

The engine 1 includes a cylinder block 3 having a front cylinder bank 2F and a rear cylinder bank 2R, a cylinder head 4 attached to the upper end of each cylinder bank 2 and a head cover 5 attached to the upper end of each cylinder head 4. An oil pan 6 is attached to the lower part of the cylinder block 3. An intake system 7 of the engine 1 is positioned between the two cylinder banks 2, and an exhaust system 8 is positioned on the outer sides of the two cylinder banks 2.

Each cylinder bank 2 defines three cylinder bores 11, and combustion chambers 12 are formed on the opposing side of the corresponding cylinder head 4 in a corresponding manner. The cylinder bores 11 and the combustion chambers 12 jointly form cylinders. Each cylinder bore 11 slidably receives a piston 15 which is connected to a crankshaft 14 of the engine 1 via a connecting rod 13.

Each combustion chamber 12 communicates with an intake port 16I which opens out on the inner side of the corresponding cylinder bank 2 and an exhaust port 16E which opens out on the outer side of the corresponding cylinder bank 2. In the illustrated embodiment, each combustion chamber 12 is provided with two intake ports 16I and two exhaust ports 16E. Valves 17 (intake valves 17I and exhaust valves 17E) are slidably supported by each cylinder head 4 for selectively closing the combustion chamber ends of the intake ports 16I and the exhaust ports 16E by being actuated by a valve actuating device 20 as will be described hereinafter.

The valve actuating device 20 includes a front valve actuating mechanism 21F configured to cause a prescribed lift operation of the intake valves 17I and the exhaust valves 17E provided in the front cylinder head 4F in synchronism with the rotation of the crankshaft 14, and a rear valve actuating mechanism 21R configured to cause a prescribed lift operation of the intake valves 17I and the exhaust valves 17E provided in the rear cylinder head 4R in synchronism with the rotation of the crankshaft 14. The rear valve actuating mechanism 21R is provided with a cylinder rest mechanism 22 that selectively prevents the lift operation of all of the intake and exhaust valves 17 for each cylinder. The cylinder rest mechanism 22 includes intake valve rest mechanisms 23 for the intake valves 17I and exhaust valve rest mechanisms 23 for the exhaust valves 17E. Each valve actuating mechanism 21 is provided with VTCs 24 (24IF, 24IR, 24EF and 24ER) or variable valve timing mechanisms for varying the timing (opening and closing timing) of the intake and exhaust valves 17. More specifically, each of the front and rear valve actuating mechanisms 21F and 21R is provided with an intake side variable valve timing mechanism or intake side VTC 24I (24IF, 24IR) for varying the timing of the intake valves 17I, and an exhaust side variable valve timing mechanism or exhaust side VTC 24E (24EF, 24ER) for varying the timing of the exhaust valves 17E. The valve rest mechanisms 23 and the VTCs 24 are actuated by oil pressure, and may be referred to as valve property varying mechanisms for varying the lift property of at least one of the intake valves 17I and the exhaust valves 17E.

Each valve actuating mechanism 21 includes, for each of the intake and exhaust sides of the corresponding cylinder bank 2, a camshaft 25 (intake camshaft 25I, exhaust camshaft 25E) provided with a plurality of cams 25a arranged along the length thereof, rocker arms 26 (intake rocker arms 26I, exhaust rocker arms 26E), lash adjusters 27 each pivotally supporting an end of the corresponding rocker arm 26, and valve lifters 28 (28A and 28B) each interposed between the corresponding rocker arm 26 and the associated valve 17. The camshafts 21 (intake camshaft 21I, exhaust camshaft 21E) are rotatively actuated in synchronism with the rotation of the crankshaft 14 at a half speed so that the valves 17 may be actuated by the cams 25a as required via the rocker arms 26 and the valve lifters 28.

Figure 2:
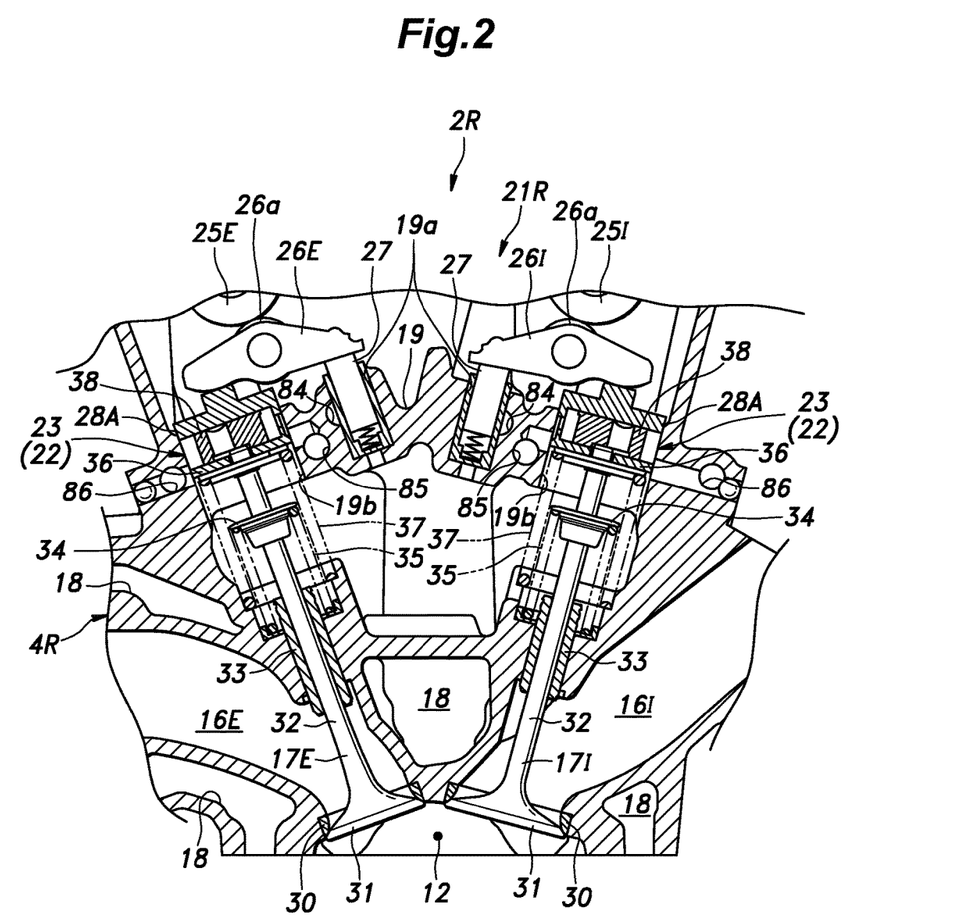
FIG. 2 is a sectional view of a cylinder head of a rear cylinder bank of the V engine.
Figure 3:
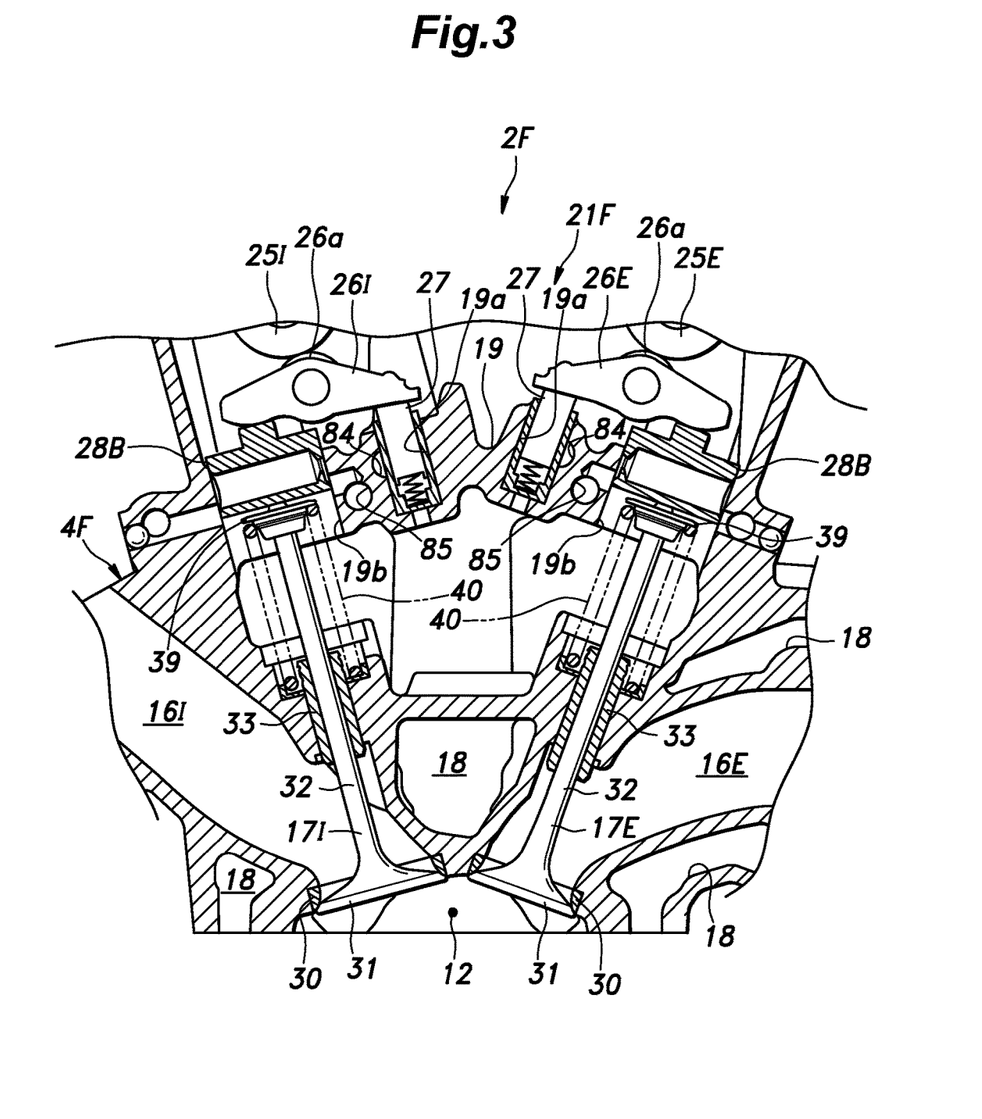
FIG. 3 is a sectional view of a cylinder head of a front cylinder bank of the V engine.

FIG. 2 is a sectional view of the cylinder head 4R of the rear cylinder bank 2R shown in FIG. 1, and FIG. 3 is a sectional view of the cylinder head 4F of the front cylinder bank 2F shown in FIG. 1. The valve actuating mechanism 21 for the rear cylinder bank 2R differs from that of the front cylinder bank 2F only in being provided with the cylinder rest mechanism 22 (valve rest mechanisms 23) which will be described hereinafter. The valve actuating mechanism 21 for the front cylinder bank 2F is not provided with a cylinder rest mechanism 22, but is otherwise similar to that for the rear cylinder bank 2R. The valve actuating mechanism 21 for the rear cylinder bank 2R is described in the following with reference to FIG. 2, and the valve actuating mechanism 21 for the front cylinder bank 2F is thereafter described with reference to FIG. 3 only with regard to the parts that are different from that for the rear cylinder bank 2R.

As shown in FIG. 2, the cylinder head 4 internally defines a water jacket 18 that passes cooling water in the parts of the cylinder head 4 that are above the combustion chambers 12, above and below the exhaust ports 16E and below the intake ports 16I. The cylinder head 4 includes a support wall 19 extending along the upper extent of the water jacket 18. The support wall 19 supports the lash adjusters 23, and additionally supports the valve lifters 28 (first valve lifters 28A) in a slidable manner.

The support wall 19 of the cylinder head 4 is formed with insertion holes 19a each receiving the base end of the corresponding hydraulic lash adjuster 27 in parallel with the associated valve 17. The support wall 19 further defines support holes 19b each slidably receiving the corresponding valve lifter 28 along the direction of the lifting movement of the associated valve 17 in a coaxial relationship to the valve 17. Each lash adjuster 27 is provided on the cylinder axial line side of the associated valve lifter 28. The rocker arms 26 consist of swing arm type rocker arms, and each rocker arm 26 is provided with a base end pivotally supported by the hydraulic lash adjuster 27 and a free end (or a swing end) slidably engaging the corresponding valve lifter 28. A lengthwise intermediate part of each rocker arm 26 is provided with a cam follower 26a consisting of a rotatably supported roller engaging the associated cam 25a.

Each valve 17 includes a valve head 31 for selectively closing the intake port or the exhaust port opening into the combustion chamber 12 by being seated on a valve seat 30 provided on the upper wall surface of the combustion chamber 12, and a valve stem 32 extending upward from the valve head 31. The valve 17 is slidably supported by the cylinder head 4 via a cylindrical valve guide 33 fitted into the cylinder head 4 and slidably guiding the valve stem 32.

A first spring retainer 34 is fixedly secured to an intermediate part of the valve stem 32. The first spring retainer 34 is normally urged in the valve closing direction by a first valve spring 35 having a relatively small diameter interposed between the upper surface of the cylinder head 4 and the first spring retainer 34. A second spring retainer 36 is slidably supported by a stem end part of the valve stem 32 in a slidable manner. The second spring retainer 36 is normally urged in the valve closing direction by a second valve spring 37 having a relatively large diameter interposed between the upper surface of the cylinder head 4 and the second spring retainer 36. The first valve spring 35 and the second valve spring 37 consist of compression coil springs.

The valve rest mechanism 23 is internally provided in each first valve lifter 28A which is slidably received in the support hole 19b and interposed between the associated valve 17 and rocker arm 26. A through hole is passed centrally through the lower wall of the first valve lifter 28A in the axial direction, and a switch pin 38 is slidably received in a diametric hole formed in the first valve lifter 28A orthogonally to the valve stem 32. The switch pin 38 is selectively moveable between a valve active position at which the valve stem 17 is engaged by the first valve lifter 28A via the switch pin 38 so as to move jointly with the first valve lifter 28A, and a valve rest position at which the valve stem 17 can freely advance into the through hole of the first valve lifter 28A and a corresponding through hole formed in the switch pin 38 so as not to move jointly with the first valve lifter 28A.

In the illustrated embodiment, as shown in FIG. 2, the switch pin 38 moves outward (away from the cylinder axis) when oil is supplied to the first valve lifter 28A from the side of the cylinder axis, and moves inward (toward the cylinder axis) when oil is supplied to the first valve lifter 28A from the side remote from the cylinder axis. When the switch pin 38 is positioned as shown in FIG. 2 (outward position), the valve rest mechanism 23 is in the valve active condition so that the valve stem 32 is engaged by the switch pin 38, and the valve 17 opens and closes in synchronism with the rotation of the camshaft 25 via the first valve lifter 28A. When the switch pin 38 is positioned on the side of the cylinder axis (inward position), the valve rest mechanism 23 is in the valve rest condition so that the valve stem 32 can be passed into the through hole of the switch pin 38, and the valve 17 does not lift without regard to the rotational angle of the camshaft 25 or the vertical displacement of the first valve lifter 28A.

The valve rest mechanism 23 is provided for each of the four first valve lifters 28A of each cylinder. The cylinder rest mechanism 22 is thus formed by the valve rest mechanisms 23, and the cylinder active condition and the cylinder rest condition can be selected by simultaneously switching the valve rest mechanisms 23 between the valve active condition and the valve rest condition. The cylinder rest mechanism 22 provided for the valve actuating mechanism 20 of the rear cylinder bank 2R prevents the lifting of the intake and exhaust valves 17 and interrupts the combustion cycle under a prescribed operating condition.

In the illustrated embodiment, the engine 1 is configured to operate in a full cylinder operation in which all of the cylinders of the rear cylinder bank 2R and the front cylinder bank 2F are in operation, and a partial cylinder operation in which all of the cylinders of the rear cylinder bank 2R are not in operation and the cylinders of the front cylinder bank 2F are in operation. The full cylinder operation is selected when the engine load is heavy such as when starting off the vehicle and accelerating, and the partial cylinder operation is selected when the engine load is light such as when traveling at a constant speed or idling. The engine control unit selects either one of the cylinder operations depending on such parameters as the depression stroke of the accelerator pedal and the rotational speed of the engine 1.

The valve actuating mechanism 21 of the front cylinder bank 2F is described in the following with reference to FIG. 3 primarily in regards to the differences from the valve actuating mechanism 21 of the rear cylinder bank 2R. As the intake side and the exhaust side of the valve actuating mechanism 21 are essentially symmetric to each other, the various components are described in the following without making any distinction between the intake side and the exhaust side. Therefore, the letters I and E to distinguish between the intake side and the exhaust side are omitted from the reference numerals.

In the valve actuating mechanism 21 of the front cylinder bank 2F, the second valve lifter 28B provided between each valve 17 and the associated rocker arm 26 is not incorporated with the valve rest mechanism 23. The valve stem 32 of each valve essentially consists of a rod of a uniform cross section. A part of the valve stem 32 adjacent to the stem end is fixedly provided with a third spring retainer 39. Each valve 17 is normally urged in the closing direction by a third valve spring 40 interposed between the third spring retainer 39 and the upper surface of the cylinder head 4.

The second valve lifters 28B are provided with an essentially same configuration as the first valve lifters 28A for the rear cylinder bank 2R, but are not provided with the switch pin 38 that forms an essential component for the valve rest mechanism 23. Also, no through hole is formed in the bottom wall of each second valve lifter 28B. Thus, the stem end of the valve 17 always abuts the lower surface of the bottom wall of the second valve lifter 28B, and opens and closes in synchronism with the rotation of the camshaft 25 via the second cam lifter 28B at all times.

The VTC system 24 is described in the following. The front valve actuating mechanism 21F and the rear valve actuating mechanism 21R are each provided with an identical intake side VTC 24I and an exhaust side VTC 24E. Therefore, only the intake side VTC 24I and the exhaust side VTC 24 of one of the valve actuating mechanisms 21 are described in the following with reference to FIG. 4.

Figure 4:
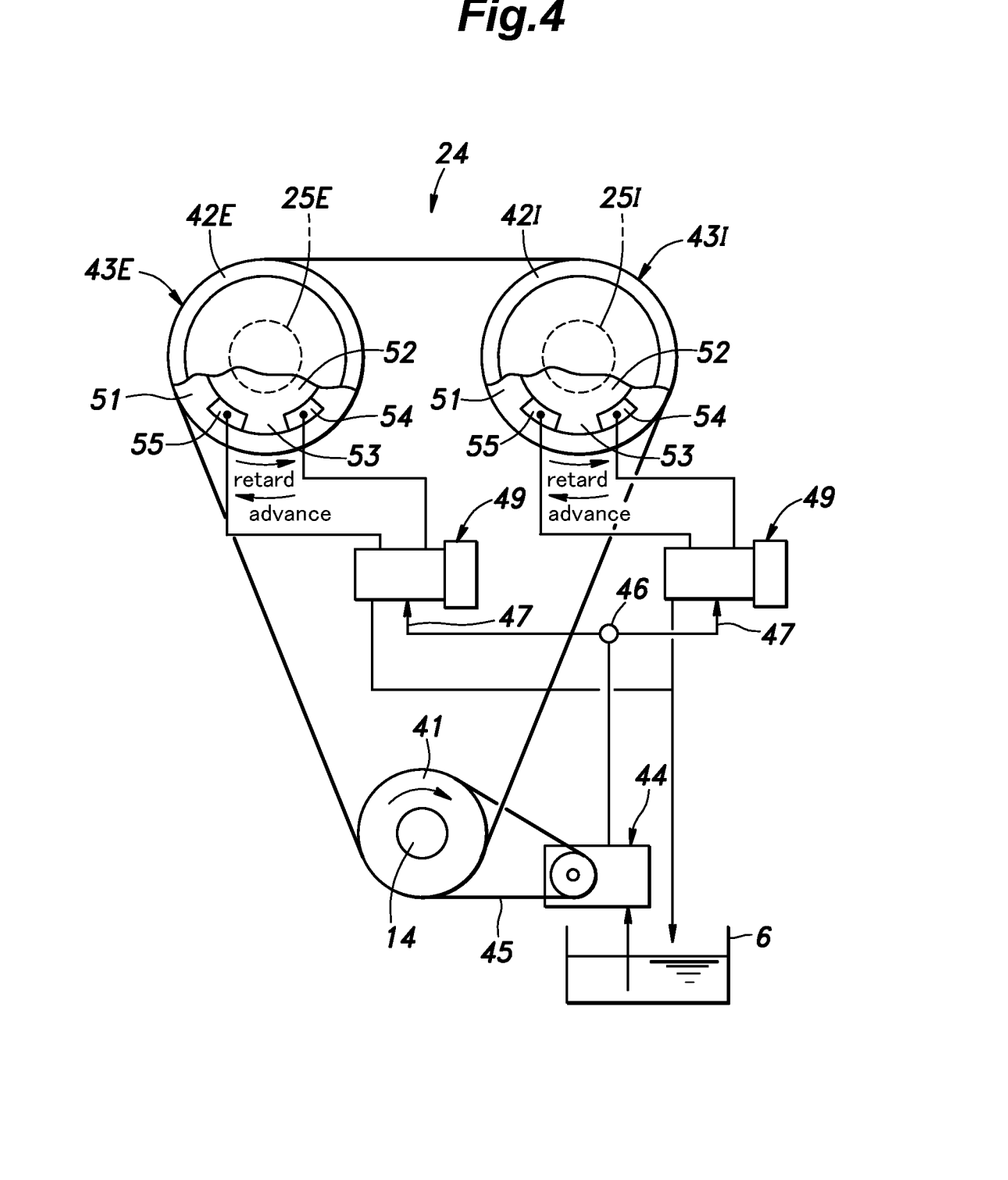
FIG. 4 is a diagram showing the structure of a VTC actuator.

As shown in FIG. 4, a crank sprocket 41 rotating integrally with the crankshaft 14 is provided at one end of the crankshaft 14. The end of the intake camshaft 25I corresponding to the crank sprocket 41 is provided with an intake side VTC actuator 43I having an intake cam sprocket 42I fitted on an outer periphery thereof. The end of the exhaust camshaft 25E corresponding to the crank sprocket 41 is provided with an exhaust side VTC actuator 43E having an exhaust cam sprocket 42E fitted on an outer periphery thereof. An endless cam chain is passed around the crank sprocket 41, the intake cam sprocket 42I and the exhaust cam sprocket 42E. The intake cam sprocket 42I and the exhaust cam sprocket 42E are rotated at a half the rotational speed of the crank sprocket 41.

An oil pump 44 is attached to a lower part of the cylinder block 3. The oil pump 44 is coupled to the crankshaft 14 via a belt transmission mechanism 45 to be rotatively actuated by the crankshaft 14. The oil pump 44 serves as a source of oil pressure that feeds the oil drawn from the oil pan 6 to various parts of the engine 1 under pressure. The oil supplied by the oil pump 44 is forwarded to a main gallery 46 extending along the cylinder row direction of the cylinder block 3 (FIG. 1). The oil is thereafter supplied to the sliding parts of the valve actuating mechanisms 21 (FIG. 1) and a turbocharger 48 (FIG. 8) as a lubricant and to the valve rest mechanisms 23 (FIG. 2) and the VTC actuators 43 via distribution oil passages 47 formed in the cylinder block 3 and the cylinder heads 4.

A pair of oil pressure control valves 49 each consisting of a per se known solenoid spool valve are attached to an upper part of an oil passage member 50 (FIG. 9) fastened to the upper part of the head cover 5 (FIG. 1), and are configured to change the mode of supplying oil (working fluid) supplied via the distribution oil passages 47 to the VTC actuators 43.

The intake side VTC actuators 43I and the exhaust side VTC actuators 43E have a substantially same configuration. Therefore, only one of the VTC actuators 43E will be described in the following with reference to FIG. 4. The exhaust side VTC actuator 43E includes a substantially cylindrical housing 51 integrally formed with the exhaust side cam sprocket 42E on the outer periphery thereof. The housing 51 receives a rotor 52 connected to the exhaust camshaft 25E so as to rotate integrally with the exhaust camshaft 25E. A vane 53 extends radially from the outer periphery of the rotor 52 so that an advance angle hydraulic chamber 54 and a retard angle hydraulic chamber 55 are defined in the housing 51 on either side of the vane 53 with respect to the rotational direction of the vane 53.

When the advance angle hydraulic chamber 54 is connected to the oil pressure supply side and the retard angle hydraulic chamber 55 is connected to the drain side, the volume of the advance angle hydraulic chamber 54 increases while the volume of the retard angle hydraulic chamber 55 decreases with the result that the rotor 52 is rotationally displaced in the clockwise direction with respect to the housing 51 as viewed in FIG. 4. This causes the opening and closing timing of the exhaust valve 17E to be shifted toward the advance side. Conversely, when the retard angle hydraulic chamber 55 is connected to the oil pressure supply side, and the advance angle hydraulic chamber 54 is connected to the drain side, the volume of the retard angle hydraulic chamber 55 increases while and the volume of the advance angle hydraulic chamber 54 decreases with the result that the rotor 52 is rotationally displaced in the counterclockwise direction with respect to the housing 51 as viewed in FIG. 4. This causes the opening and closing timing of the exhaust valve 17E to be shifted to the retard side. In this manner, the rotational angle phase of the exhaust camshaft 25E relative to the crankshaft 14, or the opening and closing timing of the exhaust valve 17E can be variably controlled.

Figure 5:
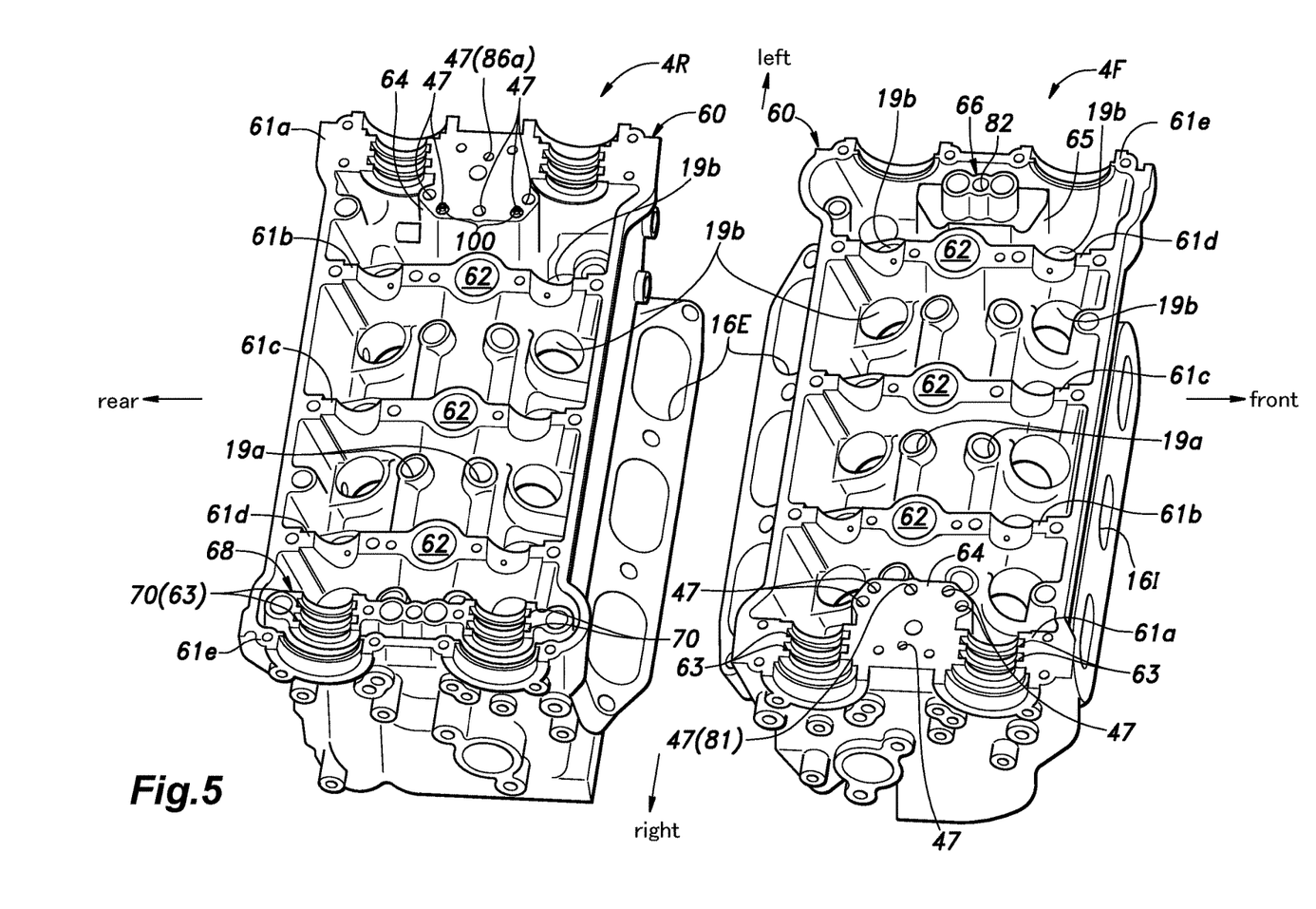
FIG. 5 is a perspective view of the two cylinder heads shown in FIG. 1.

FIG. 5 is a perspective view of the front cylinder head 4F and the rear cylinder head 4R. As clearly shown in FIG. 5, the two cylinder heads 4 are made of a same cast member (common cylinder head 60), and are arranged such that the two cylinder heads 4 are inverted relative to each other with respect to the cylinder row direction.

The front cylinder head 4F has first to fifth cam holders 61 (61*a* to 61*e*) in that order from the bottom end to the top end of the right hand side of the drawing. The cam holders 61 extend substantially over an entire width of the corresponding cylinder head 4 and form the lower half portions of journal bearings rotatably supporting the intake camshaft 25I (FIG. 1) and the exhaust camshaft 25E (FIG. 1). To the upper surfaces of the cam holders 61 are fastened the corresponding head cover 5 (FIG. 1) which is integrally formed with the cam caps forming the upper half portions of the journal bearings in cooperation with the cam holders 61. A laterally central part of each of the second to fourth cam holders 61 (61*b* to 61*d*) defines a spark plug insertion hole 62 extending in the direction of the cylinder axis between the two semicircular bearing portions. The support holes 19*b* for supporting the valve lifters 28 (FIG. 3) are formed between the adjoining cam holders 61 in pairs (on the exhaust side and the intake side). In a position laterally adjoining each support hole 19*b* on the inner side of the cylinder head 4F is formed a support hole 19*a* for receiving the corresponding hydraulic lash adjuster 27 (FIG. 3).

The first cam holder 61*a* has a larger thickness (dimension in the crankshaft axis direction) than the second to fourth cam holders 61 (61*b* to 61*e*) which have a substantially same thickness, and the bearing surfaces formed in the first cam holder 61*a* for the intake camshaft 25I (FIG. 3) and the exhaust camshaft 25E (FIG. 3) are each provided with a pair of semicircular oil grooves that define annular oil passages 63 (FIG. 3) in cooperation with similar semicircular oil grooves formed in the corresponding cam cap. The first cam holder 61*a* is integrally formed with a first shelf portion 64 which projects toward the second cam holder 61*b*, and has an upper surface flush with the upper surface of the first cam holder 61*a* (and the supper surfaces of the remaining cam holders 61*b* to 61*e*). The first shelf portion 64 internally defines the distribution oil passages 47 (five of them) all opening out at the upper surface of the first shelf portion 64. In the front cylinder head 4F, the fifth cam holder 61*e* consists of an end wall of the cylinder head 4F.

The fifth cam holder 61*e* is also formed with a similar second shelf portion 65 projecting toward the fourth cam holder 61*d*. The second shelf portion 64 has an upper surface having a lower elevation than the first shelf portion 65, and a first oil passage connecting member 66 is fastened to the upper surface of the second shelf portion 65.

Figure 6:
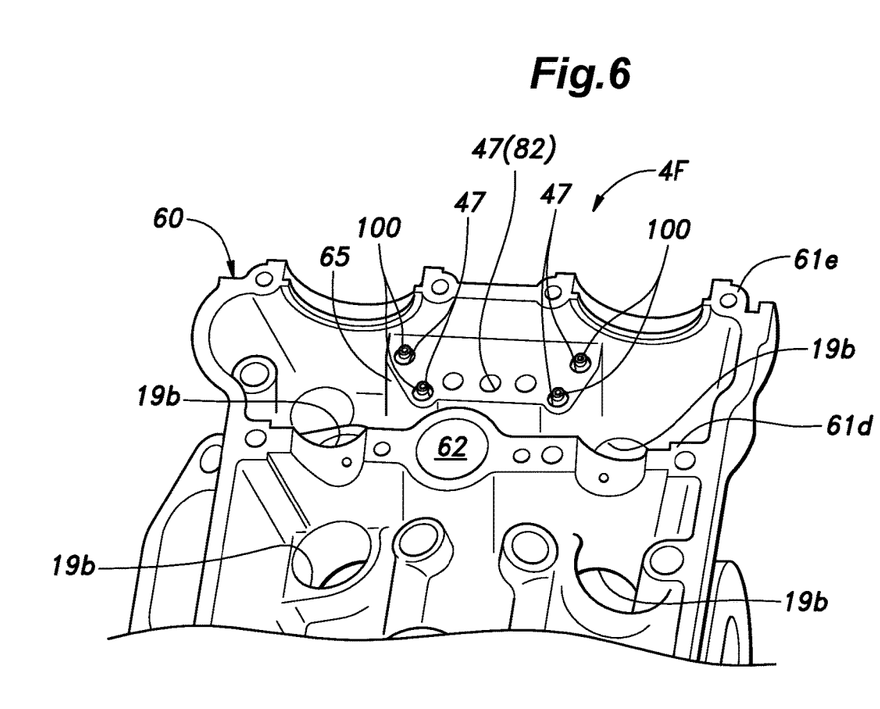
FIG. 6 is a fragmentary perspective view of an end part of the front cylinder head.

FIG. 6 is an enlarged fragmentary perspective view of a part of the front cylinder head 4F showing the second shelf portion 65 before the first oil passage connecting member 66 is attached thereto. As shown in FIG. 6, in addition to the five distribution oil passages 47 opening out at the upper surface thereof, the second shelf portion 65 is internally formed with two threaded holes (unnumbered) for fastening the first oil passage connecting member 66 to the cylinder head 4F (the second shelf portion 65). The first oil passage connecting member 66 is formed with a first connecting oil passage 67 (FIGS. 7 and 8) that communicate with at least one of the distribution oil passages 47 opening out at the upper surface of the second shelf portion 65 (all of the distribution oil passage 47 in the case of the illustrated embodiment) to supply the oil to the valve lifters 28 of the front valve actuating mechanism 21F.

Referring to FIG. 5 once again, the rear cylinder head 4R is made from a common cylinder head 60 having the same configuration as the front cylinder head 4F, except for that the rear cylinder head 4R is inverted in relation with the front cylinder head 4F with respect to the cylinder row direction, and includes first to fifth cam holders 61 (61*a* to 61*e*). A second oil passage connecting member 68 is attached to the upper surface of the second shelf portion 65, and internally defines a working oil passage that communicates with one of the five distribution oil passages 47 opening out centrally at the upper surface of the second shelf portion 65. The second oil passage connecting member 68 internally defines a pair of second connecting oil passages 70 that communicate with the working oil passage and form a part of the annular oil passages 63 for supplying oil to the VTC 24 (a valve property varying mechanism).

The second oil passage connecting member 68 is integrally formed with a pair of semicircular bearing surfaces for the exhaust camshaft 25E and the intake camshaft 25I, respectively, and these bearing surfaces are each provided with a pair of semicircular oil grooves that define annular oil passages 63 (which are similar in function as those of the front cylinder head 4F) in cooperation with similar semicircular oil grooves formed in the corresponding cam cap.

Figure 7:
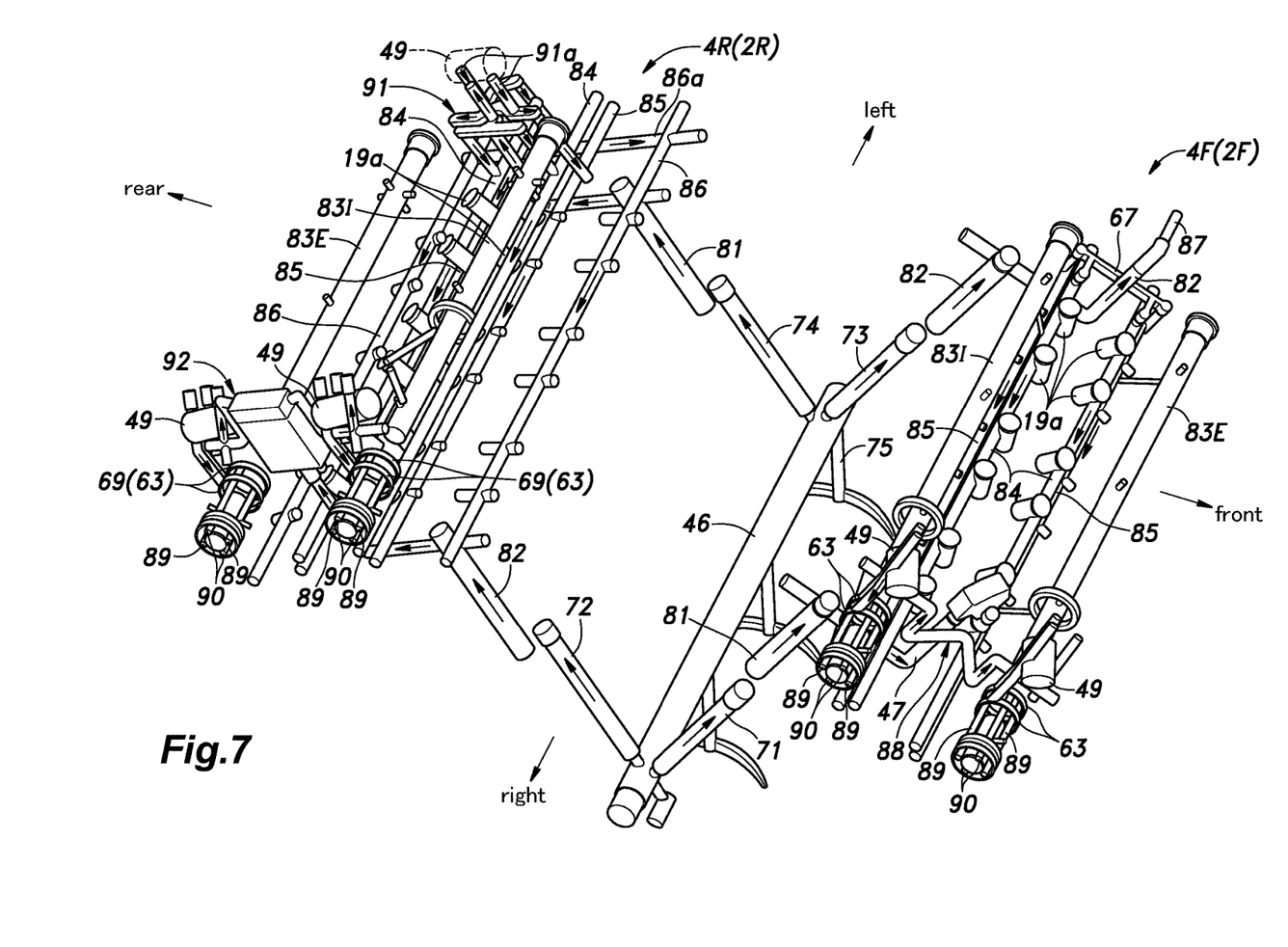
FIG. 7 is a three-dimensional view of the oil passage system of the V engine.

FIG. 7 is a perspective view showing the oil passages of the V engine shown in FIG. 1. As shown in FIG. 7, one end of the main gallery 46 communicates with a right front distribution oil passage 71 extending obliquely upward toward the front cylinder bank 2F and a right rear distribution oil passage 72 extending obliquely upward toward the rear cylinder bank 2R. The other end of the main gallery 46 communicates with a left front distribution oil passage 73 extending obliquely upward toward the front cylinder bank 2F and a left rear distribution oil passage 74 extending obliquely upward toward the rear cylinder bank 2R. Additionally, crankshaft lubricating oil passages 75 leading to the journal bearings of the crankshaft 14 and oil jet oil passages extend from the main gallery 46.

In the front cylinder head 4F, a first main distribution oil passage 81 communicating with the right front distribution oil passage 71 extends upward, and the second main distribution oil passage 82 communicating with the left front distribution oil passage 73 also extends upward. Similarly, in the rear cylinder head 4R, the first main distribution oil passage 81 communicating with the left rear distribution oil passage 74 extends upward, and the second main distribution oil passage 82 communicating with the right rear distribution oil passage 72 extends upward. In each of the front cylinder head 4F and the rear cylinder head 4R, an intake camshaft oil passage 83I extends inside the intake camshaft 25I along the axial direction, and an exhaust camshaft oil passage 83E extends inside the exhaust camshaft 25E along the axial direction. Furthermore, a pair of rocker arm lubricating oil passages 84 extend in the cylinder row direction, and communicate with the insertion holes 19a for the hydraulic lash adjusters 27. A pair of valve lifter oil passages 85 extend in the cylinder row direction, and communicate with the support holes 19b for the valve lifters 28. The intake camshaft oil passage 83I and the exhaust camshaft oil passage 83E receive a supply of oil for lubrication from the adjoining rocker arm oil passage 84.

In the rear cylinder head 4R, the valve lifter oil passages 85 function as lubricating oil passages for the valve lifters 28, and as working oil passages for bringing the valve rest mechanisms 23 into a valve active condition. A pair of valve lifter working oil passages 86 communicating with the support holes 19b (FIG. 2) for the valve lifters 28 extend in the cylinder row direction on a side of the valve lifters 28 remote from the valve lifter oil passage 85. The valve lifter working oil passages 86 are provided for the sole purpose of supplying oil to bring the valve rest mechanism to the valve rest condition as a working fluid. The two valve lifter oil passages 86 communicate with each other via communicating passages 86a inside the cylinder head 4R, and open out at the upper surface of the first shelf portion 64. In the front cylinder head 4F, the valve lifter working oil passages 86 also open out at the upper surface of the first shelf portion 64, but do not communicate with the main gallery 46 so that no oil is supplied to the valve lifter working oil passage 86. Therefore, the valve lifter working oil passages 86 are not shown as oil passages for the front cylinder head 4F in FIG. 7, and shown in FIG. 3 but are not numbered.

A first connecting oil passage 67 formed by the first oil passage connecting member 66 (FIG. 5) communicates the five distributing oil passages 47 opening out at the upper surface of the second shelf portion 65 (FIG. 5) with one another. The distribution oil passage 47 position in a central part corresponds to a downstream end portion of the second main distribution oil passage 82. The two distribution oil passages 47 arranged in intermediate parts thereof communicate with the rocker arm lubricating oil passages 84 on the intake side and the exhaust side, respectively. The two distribution oil passages 47 arranged in outer parts are in communication with the valve lifter oil passages 85 on the intake side and the exhaust side, respectively. On the upper surface of the first oil passage connecting member 66 (FIG. 5), a second main distribution oil passage 82 opens out. The second main distribution oil passage 82 communicates with the turbocharger 48 (see FIG. 8) via a first cover connecting oil passage 87 formed in the cam cap (formed in the head cover 5) or a part of the head cover 5 which is configured to be attached to the upper surface of the first oil passage connecting member 66.

As shown in FIG. 6, the four distribution oil passages 47 (excluding the one in the center) communicating with the rocker arm lubricating oil passages 84 and the valve lifter oil passages 85 are each provided with an orifice 100 for restricting the oil flow. These orifices 100 are typically formed in orifice forming members which are fitted into openings formed on the upper surface of the first shelf portion 64.

As shown in FIG. 5, the distribution oil passage 47 opening out at the center of the upper surface of the first shelf portion 64 of the front cylinder head 4F is a downstream portion of the first main distribution oil passage 81. The four distribution oil passages 47 (excluding the one in the center) communicate with the rocker arm lubricating oil passages 84, and the valve lifter oil passages 85, respectively, but are closed by the cam cap or a part of the head cover 5. Therefore, these distribution oil passages 47 are not shown in FIG. 7. On the other hand, the first main distribution oil passage 81 (or the central distribution oil passage 47) distributes the oil in the fore and aft directions via second cover connecting oil passages 88 formed in the cam cap or the head cover 5, and communicates with the two annular oil passages 63 via respective oil pressure control valves 49 provided in the cam cap or the head cover 5. One of the annular oil passages 63 communicates with the advance angle oil pressure chamber 54 (FIG. 4) via a camshaft advance angle oil passage 89 formed in the camshaft 25, and the other annular oil passage 63 communicates with the retard angle oil pressure chamber 55 (FIG. 4) via a camshaft retard angle oil passage 90 also formed in the camshaft 25.

As shown in FIG. 7, in the rear cylinder head 4R, all of the five distribution oil passages 47 opening out at the upper surface of the first shelf portion 64 (FIG. 5) communicate with a third cover connecting oil passage 91. The third cover connecting oil passage 91 branches out into three passages to communicate with the oil pressure control valve 49 (shown in imaginary lines) and the two rocker arm lubrication oil passages 91a, and form a pair working oil passages 91a extending downward from the oil pressure control valve 49. One of the rocker arm lubrication oil passages 91a branches out in two directions to communicate with the respective valve lifter oil passages 85, and the other rocker arm lubrication oil passage 91a communicates with a communication passage 86a of the valve lifter working oil passage 86 opening out at the upper surface of the first cam holder 61a (FIG. 5).

As shown in FIG. 5, the two of the distribution oil passages 47 opening out at the upper surface of the first shelf portion 64 of the rear cylinder head 4R are also provided with orifices 100. These orifices 100 are typically formed in orifice forming members which are fitted into openings formed on the upper surface of the first shelf portion 64.

The distribution oil passage 47 opening out at the center of the upper surface of the first shelf portion 64 of the front cylinder head 4F, similarly as those formed in the rear cylinder head 4R shown in FIG. 6, is a downstream portion of the first main distribution oil passage 82 (FIG. 7). The four distribution oil passages 47 excluding the one in the center communicate with the rocker arm lubricating oil passages 84 (FIG. 7), and the valve lifter oil passages 85 (FIG. 7), respectively, but are closed by the second oil passage connecting member 68 as shown in FIG. 5. The second main distribution oil passage 82 distributes the oil in the fore and aft directions via fourth cover connecting oil passages 92 formed in the cam cap or the head cover 5, and communicates with a pair of annular oil passages 63 (second connecting oil passage 70) via respective oil pressure control valves 49 provided in cam cap or the head cover 5. One of the annular oil passage 63 communicates with the advance angle oil pressure chamber 54 (FIG. 4) via a camshaft advance angle oil passage 89 formed inside the camshaft 25, and the other annular oil passage 63 communicates with the retard angle oil pressure chamber 55 (FIG. 4) via a camshaft retard angle oil passage 90 also formed in the camshaft 25.

Figure 8:
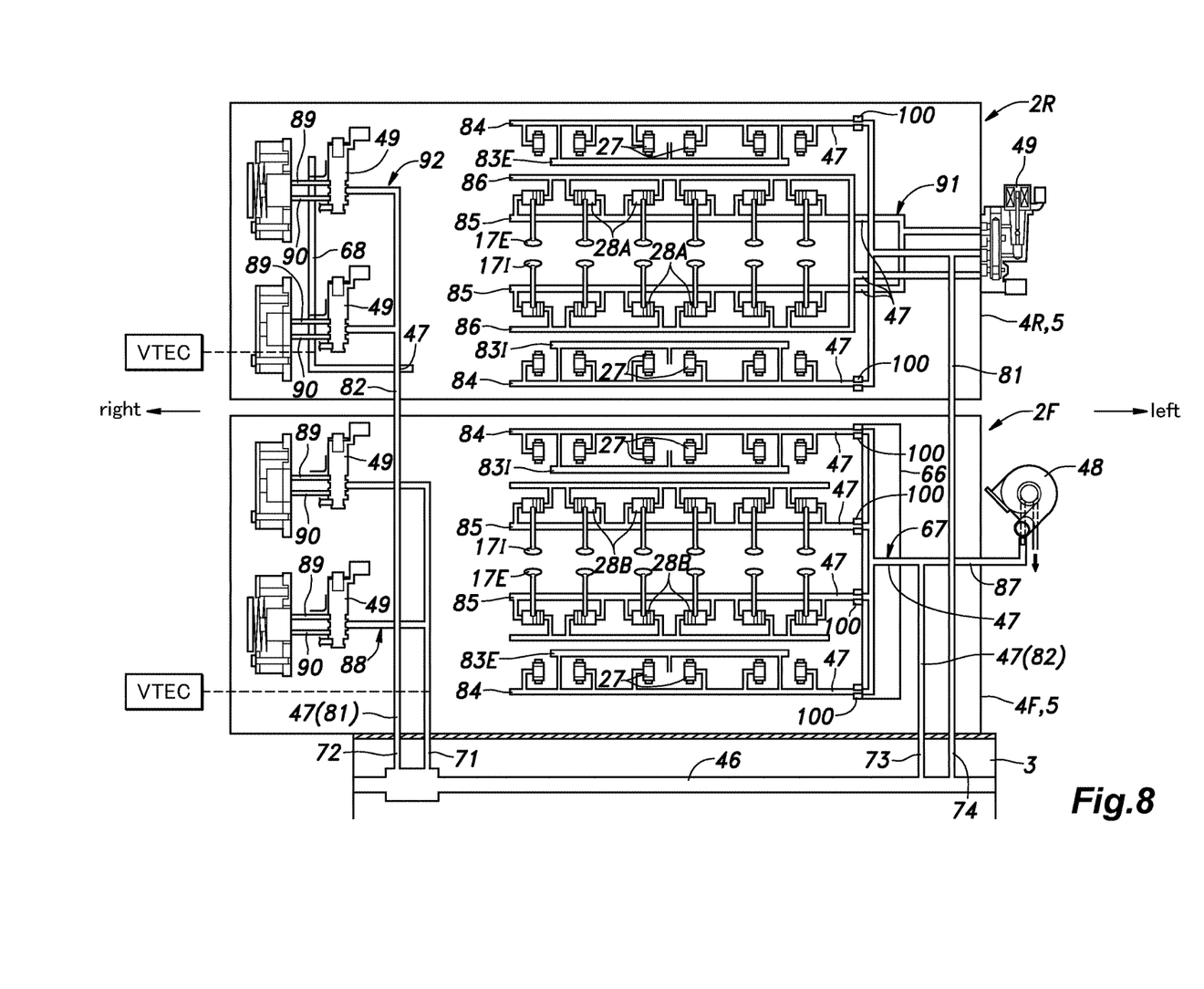
FIG. 8 is an oil circuit diagram of the oil passage system of the V engine.

FIG. 8 is a diagram illustrating the overall configuration of the oil passages in the engine 1. As discussed above, the first connecting oil passage 67 formed by the first oil passage connecting member 66 is provided on the left side of the front cylinder bank 2F. The first connecting oil passage 67 branches out into four distribution oil passages 47 of the front cylinder head 4F via the respective orifices 100. Also, the two distribution oil passages 47 communicating with the third cover connecting oil passage 91 formed on the left side of the rear cylinder head are each provided with the orifices 100 communicating with the corresponding rocker arm lubrication oil passage 84.

In each of the cylinder banks 2, one of the distribution oil passages 47 formed on the right hand side of the cylinder head 4 is used as a working oil passage for the VTC 24. The first cam holder 61a (FIG. 5) on the right side of the cylinder head 4R is not formed with annular oil passages 63, and instead, a part of an annular oil passage is formed by the second connecting oil passage 70 formed in the second oil passage connecting member 68 fastened to the second shelf portion 65.

Figure 9:
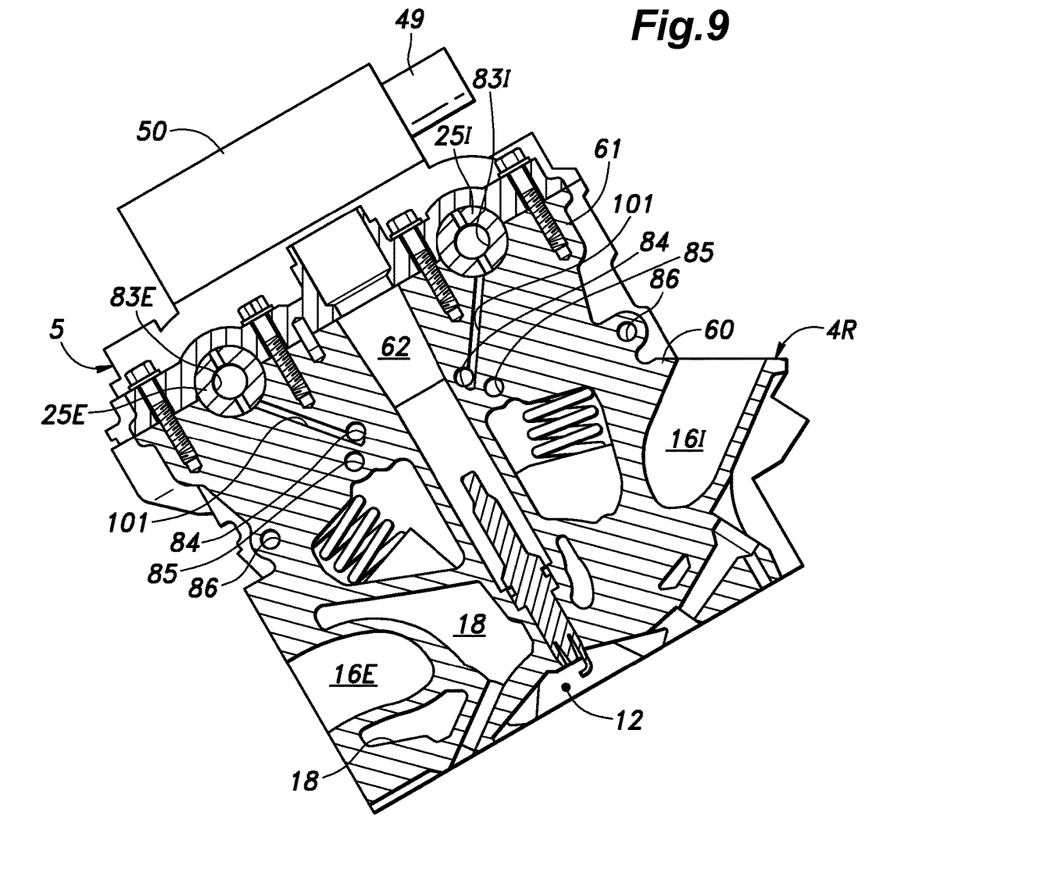
FIG. 9 is a sectional view of the rear cylinder head.

FIG. 9 is a sectional view of the cylinder head 4R shown in FIG. 1. As discussed above, lubricating oil is supplied to the camshaft oil passages 83 via the rocker arm lubricating oil passages 84. As shown in FIG. 9, each of the second cam holder 61b (FIG. 5) and the fourth cam holder 61d (corresponding to the upstream ends and the downstream ends of the camshaft oil passage 83 and the rocker arm lubricating oil passage 84 extending in the cylinder row direction) is formed with a pair of linear extension oil passages 101 so as to extend the intake camshaft oil passage 83I to the intake side rocker arm lubricating oil passage 84 and extend the exhaust camshaft oil passage 83E to the exhaust side rocker arm lubricating oil passage 84, respectively, and communicate the two oil passages to each other in each case.

The intake side extension oil passage 101 extends vertically from the intake side rocker arm lubricating oil passage 84 to the intake side camshaft passage 83I, and opens out at the hearing surface of the intake camshaft 25I (upper surface of the rear cylinder head 4R). The exhaust side extension oil passage 101 extends obliquely upward from the exhaust side rocker arm lubricating oil passage 84 to the exhaust side camshaft oil passage 83E, and opens out at the bearing surface of the exhaust camshaft 25E (the upper surface of the rear cylinder head 4R). The upper end of the exhaust side extension oil passage 101 is closed by the exhaust camshaft 25E.

These extension oil passages 101 serve as air reservoir chambers for expelling air that may be trapped in the rocker arm lubricating oil passages 84. During the operation of the engine 1, the air trapped in the extension oil passages 101 is expelled from the sliding parts of the camshafts 15 (bearing gaps between the cam journals and the cam holders 61) to the valve actuating chamber. When the engine 1 is stopped while air is trapped in the extension oil passages 101, and when air is collected in the extension oil passages 101 while the engine 1 is kept stationary over an extended period of time, the air is expelled to the outside from the sliding parts of the camshafts 25 by the oil fed under pressure from the oil pump immediately after the engine 1 is started.

The front cylinder head 4F is made of the same common cylinder head 60, and similar extension oil passages 101 are formed in the front cylinder head 4F. These passages may be formed by drilling.

The engine 1 discussed above provides the following advantages.

As shown in FIG. 5, the front cylinder head 4F and the rear cylinder head 4R are formed by combining the two common cylinder heads in a mutually inverted relationship with respect to the cylinder row direction, and the distribution oil passages 47 for supplying oil from the main gallery 46 (FIG. 7) to the front valve actuating mechanism 21F (FIG. 1), the rear valve actuating mechanism 21R, the valve rest mechanisms 23 and the VTCs 24 open out at the upper surface of each cylinder head 4. At least one of the distribution oil passages 47 is provided with an orifice 100 for controlling the oil flow. Therefore, even though the valve rest mechanisms 23 and the VTCs 24 are provided in only one of the cylinder heads 4, the common cylinders 60 may be used for the front cylinder head 4F and the rear cylinder head 4R, and flow rates of the oil can be controlled in an appropriate manner.

The second oil passage connecting member 68 forming the second connecting oil passage 70 communicating with at least one of the distribution oil passages 47 and supplying oil to the VTC 24 is attached to the upper surface of the rear cylinder head 4R provided with the valve rest mechanisms 23 (FIG. 1) and the VTC 24. Therefore, the oil is supplied to the VTC via the second connecting oil passage 70 formed in the second oil passage connecting member 68. Also, the second connecting oil passage 70 which is absent the front cylinder bank 2F is not required to be integrally formed in the common cylinder head 60 so that the material cost and the weight are not required to be increased.

In the illustrated embodiment, the distribution oil passages 47 formed on the right sides of the front cylinder head 4F and the rear cylinder head 4R communicate with the VTCs 24 (FIG. 1). The distribution oil passage 47 formed on the left side of the rear cylinder head 4R communicates with the valve rest mechanisms 23 (FIG. 1). As shown in FIG. 6, the four distribution oil passages 47 provided on the left side of the front cylinder head 4F and communicating with the lash adjusters 27 of the front valve actuating mechanism 21F (the rocker arm lubricating oil passage 74), the camshafts (camshaft oil passages 83) and the valve lifters 28 (the valve lifter oil passages 85) are each provided with an orifice 100.

Each cylinder head 4 is formed with the rocker arm lubricating oil passages 84 which are connected to the lower ends of the extension oil passages 101 extending vertically and functioning as air reservoirs. The upper end of each extension oil passage 101 opens out at the upper surface of the corresponding cylinder head 4, and is closed by the corresponding camshaft 25 forming the front valve actuating mechanism 21F or the rear valve actuating mechanism 21R. Therefore, the air may be purged via the sliding parts of the camshafts 25 during the operation of the engine 1 and at the time of starting the engine 1. The extension oil passages 101 connected to the respective rocker arm lubricating oil passages 84 can be formed by drilling into the common cylinder head 60.

Although the present invention has been described in terms of a preferred embodiment thereof, it is obvious to a person skilled in the art that various alterations and modifications are possible without departing from the scope of the present invention. The engine 1 was fitted with the VTC for varying the opening and closing timings of the intake and exhaust valves as a valve property varying mechanism, but may alternatively or additionally be provided with a variable valve lift mechanism (VTEC: Trademark of Honda Motor Co., Ltd.) for varying the lift of the intake and exhaust valves 17 as indicated by dotted lines in FIG. 8.

The invention claimed is:
1. A V engine, comprising:
 a cylinder block including a first cylinder bank and a second cylinder bank, and defining a main gallery extending along a crankshaft axis of the engine, each cylinder bank defining a row of cylinders;

a first cylinder head attached to an upper end of the first cylinder bank;

a second cylinder head attached to an upper end of the second cylinder bank, the second cylinder head being of a same configuration as the first cylinder head, and disposed in an inverted relationship to the first cylinder head with respect to the crankshaft axis of the engine;

a first valve actuating mechanism for driving intake valves and exhaust valves of the first cylinder head, the first valve actuating mechanism including an intake sprocket attached to an end of an intake camshaft and an exhaust sprocket attached to an end of an exhaust camshaft, the intake sprocket and the exhaust sprocket being rotatively actuated by a crankshaft of the engine;

a second valve actuating mechanism for driving intake valves and exhaust valves of the second cylinder head, the second valve actuating mechanism including an intake sprocket attached to an end of an intake camshaft and an exhaust sprocket attached to an end of an exhaust camshaft, the intake sprocket and the exhaust sprocket being rotatively actuated by the crankshaft of the engine;

a first shelf portion formed in an end part of the first cylinder head remote from a sprocket end part thereof and internally defining a plurality of distribution oil passages opening out at an upper surface of the first shelf portion, at least one of the distribution oil passages communicating with the main gallery;

a second shelf portion formed in a sprocket end part of the second cylinder head and internally defining a plurality of distribution oil passages opening out at an upper surface of the second shelf portion, at least one of the distribution oil passages communicating with the main gallery;

a first oil passage connecting member attached to the upper surface of the first shelf portion and internally defining a first connecting oil passage communicating with the distribution oil passages opening out at the upper surface of the first shelf portion in a first pattern; and a second oil passage connecting member attached to the upper surface of the second shelf portion and internally defining a second connecting oil passage communicating with the distribution oil passages opening out at the upper surface of the second shelf portion in a second pattern.

2. The V engine according to claim 1, further comprises a valve property varying mechanism for varying a lift property and/or a valve timing of the intake valves and/or exhaust valves by being actuated by oil pressure supplied via at least one of the distribution oil passages.

3. The V engine according to claim 2, wherein the upper surface of each shelf portion is lower than a parting plane between the corresponding cylinder head and a head cover attached to an upper end of the cylinder head.

4. The V engine according to claim 3, wherein the sprocket end part of the first cylinder head is formed with a semicircular recess surrounding the corresponding intake camshaft or exhaust camshaft in cooperation with a corresponding semicircular recess formed in a cam cap or the head cover, a pair of annular oil passages being defined by semicircular grooves formed in an inner circumferential surface of the semicircular recess formed in the sprocket end part of the first cylinder head and corresponding semicircular grooves formed in an inner circumferential surface of the semicircular recess formed in the cam cap or the head cover; and the second oil passage connecting member includes a lateral extension defining a semicircular recess surrounding the corresponding intake camshaft of exhaust camshaft in cooperation with a corresponding semicircular recess formed in a cam cap or the head cover, a pair of annular oil passages being defined by semicircular grooves formed in an inner circumferential surface of the semicircular recess of the lateral extension of the second oil passage connecting member and corresponding semicircular grooves formed in an inner circumferential surface of the semicircular recess formed in the cam cap or the head cover.

5. The V engine according to claim 4, wherein the valve property varying mechanism comprises a variable valve lift mechanism using oil pressure supplied via the annular oil passages and internal passages of the intake camshaft and/or the exhaust camshaft.

6. The V engine according to claim 4, wherein the valve property varying mechanism comprises a variable valve timing mechanism using oil pressure supplied via the annular oil passages and internal passages of the intake camshaft and/or the exhaust camshaft.

7. The V engine according to claim 2, wherein the valve property varying mechanism comprises a valve rest mechanism including a valve lifter interposed between a valve stem of an engine valve and a swing end of a rocker arm and provided with a switch member moveable under oil pressure between a valve rest position and a valve active position, one of the distribution oil passages being configured to supply lubricating oil for the valve lifter and a working oil for actuating the switch member into one of the two positions, and a different one of the distribution oil passages being configured to supply a working oil for actuating the switch member into the other position.

8. The V engine according to claim 7, wherein the valve rest mechanism is provided only in the second cylinder head, and the distribution oil passage configured to supply a working oil for actuating the switch member into the other position for the first cylinder head is disconnected from the valve lifter by the first oil passage connecting member.

9. The V engine according to claim 7, wherein at least the second cylinder head is formed with a pair of rocker arm lubricating oil passages for lubricating intake side and exhaust side rocker arms, a pair of first valve lifter oil passages for lubricating the intake side and exhaust side valve lifters and actuating the switch members of the intake side and exhaust side valve lifters into one of the two positions, and a pair of second valve lifter oil passages for actuating the switch members of the intake side and exhaust side valve lifters into the other position, all extending horizontally along the crankshaft axis.

10. The V engine according to claim 1, wherein open ends of the distribution oil passages opening out at the upper surface of one of the first and second shelf portions are fitted with orifice forming members in a pattern different from that for open ends of the distribution oil passages opening out at the upper surface of the other of the first and second shelf portions.

* * * * *